US006723243B2

(12) United States Patent
Jensen

(10) Patent No.: US 6,723,243 B2
(45) Date of Patent: Apr. 20, 2004

(54) PERIPHYTON FILTRATION PRE- AND POST-TREATMENT SYSTEM AND METHOD

(75) Inventor: Kyle R. Jensen, Apopka, FL (US)

(73) Assignee: AquaFiber Technologies Corporation, Winter Park, FL (US)

( * ) Notice: Subject to any disclaimer, the term of this patent is extended or adjusted under 35 U.S.C. 154(b) by 0 days.

(21) Appl. No.: 09/940,977

(22) Filed: Aug. 28, 2001

(65) Prior Publication Data

US 2002/0153301 A1 Oct. 24, 2002

Related U.S. Application Data

(60) Provisional application No. 60/285,001, filed on Apr. 19, 2001.

(51) Int. Cl.[7] .............................. C02F 3/32; C02F 1/78; C02F 1/30
(52) U.S. Cl. ....................... 210/602; 210/631; 210/748; 210/170; 210/205; 210/259
(58) Field of Search ................................ 210/602, 631, 210/748, 760, 202, 205, 170, 259, 906

(56) References Cited

U.S. PATENT DOCUMENTS

| | | | |
|---|---|---|---|
| 3,794,582 A | * | 2/1974 | Lackme et al. ............. 210/614 |
| 4,141,830 A | * | 2/1979 | Last ............................ 210/748 |
| 4,333,263 A | | 6/1982 | Adey |
| 5,037,550 A | * | 8/1991 | Montagnon et al. ........ 210/602 |
| 5,078,881 A | | 1/1992 | Augustine et al. |
| 5,131,820 A | | 7/1992 | Jensen |
| 5,364,537 A | * | 11/1994 | Paillard ....................... 210/743 |
| 5,389,257 A | * | 2/1995 | Todd et al. ................. 210/602 |
| 5,527,456 A | | 6/1996 | Jensen |
| 5,573,669 A | | 11/1996 | Jensen |
| 5,591,341 A | | 1/1997 | Jensen |
| 5,846,423 A | | 12/1998 | Jensen |
| 5,851,398 A | * | 12/1998 | Adey ......................... 210/602 |
| 5,985,147 A | | 11/1999 | Jensen et al. |

FOREIGN PATENT DOCUMENTS

| | | |
|---|---|---|
| JP | 2-83095 | 3/1990 |
| JP | 2-83097 | 3/1990 |
| JP | 3-270793 | * 12/1991 |
| JP | 2000-117287 | 4/2000 |

OTHER PUBLICATIONS

*Ozone in Water Treatment Application and Engineering*, Cooperative Research Report, American Water Works Association and Compagnie Générale des Eanx, Lewis Publishers, 1991, pp. 31–79, 133–135, 154–157, 254, 273–298.

* cited by examiner

*Primary Examiner*—Fred G. Prince
(74) *Attorney, Agent, or Firm*—Allen, Dyer, Doppelt, Milbrath & Gilchrist, P.A.

(57) ABSTRACT

Periphyton filtration is a known method for performing bioremediation of polluted water, removing nutrients from the influent on which the attached algae thrive. The present system improves upon this method by adding a strong oxidizer to the influent, and, in some cases, to the effluent, to make organically bound nutrients available to a target culture of periphyton or aquatic plants to reduce the population of undesirable microinvertebrates, to make organically bound nutrients available to the periphyton, and to reduce the level of toxic compounds. A particular embodiment comprises ozonating the water. A pesticide may be added to control insect populations.

29 Claims, 2 Drawing Sheets

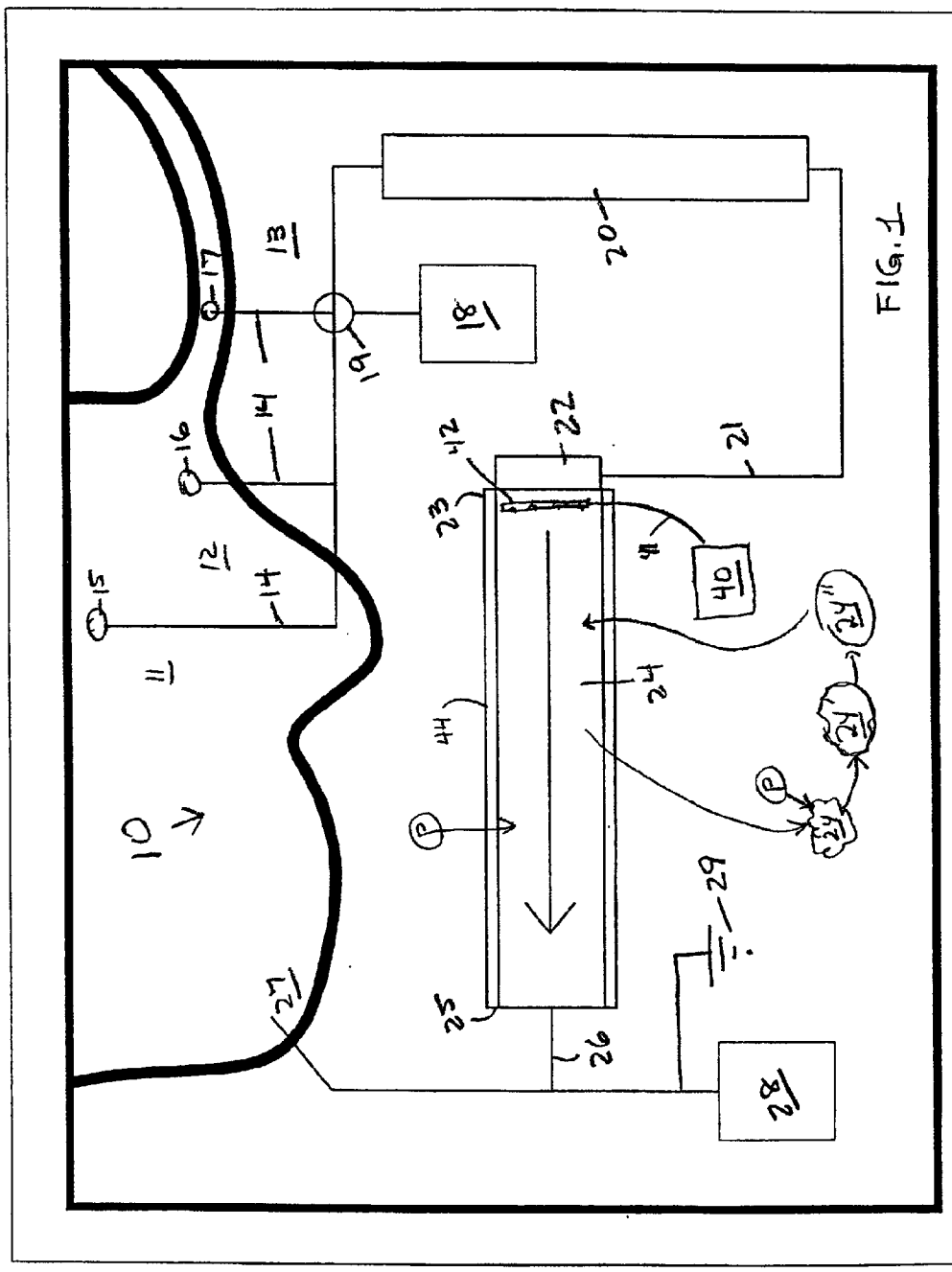

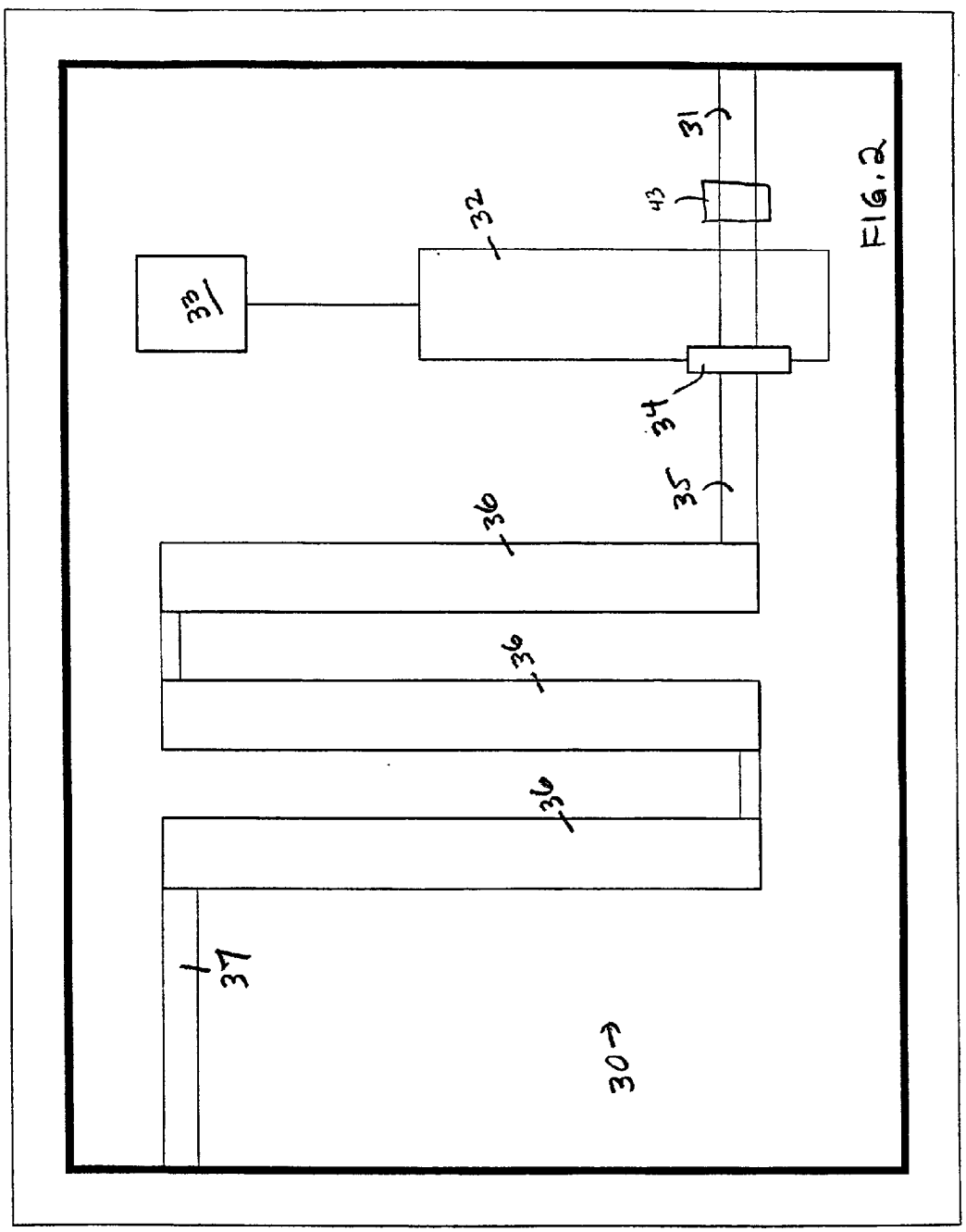

PERIPHYTON FILTRATION PRE- AND POST-TREATMENT SYSTEM AND METHOD

CROSS-REFERENCE TO RELATED APPLICATION

This application claims priority to provisional application No. 60/285,001, filed Apr. 19, 2001, "Periphyton Filtration Pretreatment System and Method."

BACKGROUND OF THE INVENTION

1. Field of the Invention

The present invention relates to systems and method for improving water quality, and, more particularly, to such systems and methods for bioremediating water with an attached algal colony, and, most particularly, to treating water against undesired toxins, microorganisms, and other water-borne pollutants in concert with an attached algal colony.

2. Description of Related Art

Algae comprise a group of plants, existing in approximately 18,000 different species, whose primary nutrients include carbon, nitrogen, and phosphorus, as well as a suite of micronutrients essential to plant growth.

The removal of contaminants from wastewater and ground water has become an important problem in restoring ecological balance to polluted areas. It is known that some algal species are capable of absorbing heavy metals into their cell walls, thus reducing their toxic effects on the environment. Algae can also take up nutrients and micronutrients that may be present in overabundance, such as phosphorus, potassium, nitrogen, iron, aluminum, and calcium, and can thus be utilized to remediate an ecosystem. Such remediation can occur when water flows over stationary algae, also absorbing carbon dioxide and releasing oxygen in the process as a result of respiration and photosynthesis. Further, the water passing over the PF experiences an increase in pH owing to the removal of carbon. The filtration can occur through adsorption, absorption, physical trapping, and other more complex means.

A system used to effect this uptake is known as a periphyton filter, the periphyton comprising a culture of a family of fresh, brackish, and/or salt-water aquatic plants known as attached microalgae. Unlike such organisms as free-floating plankton, benthos or attached algae is stationary community of epiphytes that will grow on a wide variety of surfaces. When occurring in the path of flowing water, the stationary algae remove nutrients and other compounds from the passing water, while absorbing $CO_2$ and releasing $O_2$ as a result of respiration and photosynthesis. Once a colony is established, roots or holdfasts cover the culture surface. If the plant bodies are harvested, leaving the roots behind, the nutrients and other pollutants contained in the plant bodies are removed from the water, causing a natural filtration effect.

A further advantage to this technique is that the enriched algae can be harvested and used as fish or animal feed, which serves to return the nutrients to the food chain.

Periphyton filters (PF) have the potential for use in a variety of applications. For example, the turf can be used to replace biological or bacteriological filters in aquaria. As mentioned, natural periphyton can be used to remove nutrients and other contaminants from polluted waters. In addition, by harvesting the algal mass, various processes can be used to produce a biomass energy source such as methane or ethanol, fertilizer, a human or animal food additive or supplement, cosmetics, or pharmaceuticals.

The high productivity of the algae in a fibrous form has also yielded uses in the paper and paper products industry, as the harvested algae are stronger and easier to process than wood fiber. This capability has resulted in a sustainable method of managing human impact on aquatic ecosystems.

Periphyton filters behave differently in water with varying location, speciation, chemical characteristics, and other parameters. Experience in situ has in some cases resulted in weak or poor productivity owing to low concentrations of available nutrients. It has been shown that if a fraction of the primary nutrients are not available, then the periphyton filters struggle to develop the critical mass necessary to invoke a substantial precipitation and physical trapping capability and concurrent filtration characteristics. In particular, the presence of microinvertebrates and their eggs can compromise the success of a periphyton filtration system by consuming desirable periphyton and by eating the root or holdfast of the algal filament.

Toxic cyanobacteria pose a particularly formidable set of filtration challenges in that the toxins are very persistent in the environment and can exist both inside and outside the algal cell. It is known to treat toxin-containing water with ozone because of its strong oxidizing effect when mixed in water; however, the nutrients in ozonated water become available and are reconsumed by the toxic algae.

Studies in algal turf production are known in the art. Algal turf techniques have been disclosed in Adey's U.S. Pat. No. 4,333,263, and the present inventor's U.S. Pat. Nos. 5,131, 820, 5,527,456, 5,573,669, 5,591,341, 5,846,423, and 5,985, 147, the disclosures of which are incorporated herein by reference.

SUMMARY OF THE INVENTION

It is therefore an object of the present invention to provide a system and method for pretreating and/or post-treating water in concert with a periphyton filtration bed.

It is another object to provide such a system and method for reducing a population of undesirable microinvertebrates in a periphyton filtration bed.

It is an additional object to provide such a system and method for reducing or eliminating toxins from inflow water as well as a toxicity level of harvested algal mass.

These objects and others are attained with the system and method of the present invention. The system comprises means for adding a strong oxidizer to the influent, and, in some cases, to the effluent. A particular embodiment comprises ozonating the water.

The method of treating water comprises the steps of exposing water desired to be treated to ozone in sufficient quantity to reduce a concentration of undesired microorganisms therein and flowing the water over a colony of attached algae to remove undesired matter therefrom, such as, but not intended to be limited to, nutrients.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWING

FIG. 1 is a schematic illustration of a first embodiment of the invention.

FIG. 2 is a schematic illustration of a second embodiment of the invention.

DETAILED DESCRIPTION OF THE PREFERRED EMBODIMENTS

A description of the preferred embodiments of the present invention will now be presented with reference to FIGS. 1 and 2.

It is known to use ozone to treat water because of the properties of the unstable $O_3$ molecule, which is a strong oxidizer. Ozone is typically generated, for example, by ultraviolet radiation or corona discharge. Since ozone is a gas, it must be dissolved or broken into small bubbles to optimize contact with the target microorganisms in the influent and, in some cases, the effluent. An optimal residence time should be achieved in the water to be treated to maximize particle contact. This may be achieved, for example, with a mixing chamber or a mixing pump.

If the location of the periphyton filter is at some distance from the water to be treated, mixing may occur, for example, downstream and generally adjacent a supply pump or pipe entrance, with a single or multiple static mixers agitating the water/ozone combination. The residence time is then equal to the travel time to the periphyton filter, which can be tested for sufficiency of contact time. In addition, further static mixers and ozone injection points may be positioned along the pathway to the periphyton filter to increase effectiveness and efficiency.

In an alternate embodiment a covered pond may be used, such a pond cover having an ozone destruct port at the highest location to catch ozone prior to escaping into the atmosphere. A subsurface "well-style" tank may be used to increase contact time, such a tank having a high-pressure ozone injection at its bottom for optimal dispersion of ozone into the water column.

The present invention provides the following benefits:

- Ozone breaks up planktonic algae, bacteria, and other organically bound particles in lake water, thereby making nutrients available for use and concurrent growth of the periphyton.
- After the nutrients are available and removed by the periphyton, the water can be returned to the water body from which it came, or to another water body, in a state that will limit the ability of toxic algae to regrow, thereby effecting remediation.
- Ozone destroys certain toxic compounds found in cyanobacteria (blue-green algae) recently found to be dangerous to humans and other animals. These toxic compounds, as well as nontoxic compounds, are then available to be taken up by filamentous algae grown for industrial use, such as in the paper products industry
- Ozone destroys both microinvertebrates and their eggs, which often settle, hatch, and grow as they consume desirable periphyton, thus reducing the effectiveness of filtration.

Other devices to be used alone or in conjunction with ozone to enhance performance are plasma sparkers and ultraviolet light treatment systems, such as are known in the art.

Two embodiments of the present invention are illustrated schematically in FIGS. 1 and 2. In the first embodiment (FIG. 1) of the system 10 water is shown being taken in from deep water 11, shallow water 12, or a tributary 13 by way of pipes 14 and pumps 15–17, respectively. An ozone generator 18 provides ozone to an ozone injection apparatus 19 so that the water desired to be treated can be contacted with ozone in chamber 20. Alternately, as mentioned above, a submersible plasma sparker may be used. Ozonated water is carried via transfer piping 21 to a distribution manifold 22, which distributes the water to the inlet end 23 of a periphyton bed 24, which is tilted to permit the water to flow downward to the outlet end 25. The treated water is then collected into a transfer pipe system 26, and is then either returned to a waterway 27 or transferred to a drinking water treatment system 28 of ground water aquifers 29.

In the second embodiment (FIG. 2) of the system 30, inflowing water 31 is pumped into ozone distribution piping 32, into which is also injected ozone from an ozone generator 33. Prior to exposure to ozone, the water may be exposed to at least one of ultraviolet radiation and acoustic energy 43. Following passage through an ozone injection diffuser 34, the water proceeds via transfer piping 35 into multiple ozone contact chambers 36. Three are shown here, but this is not intended as a limitation. When fully ozonated, the water exits via discharge piping 37.

In either of the above-described embodiments, an additional step may be taken of adding a pesticide to the algal colony for controlling insects. The pesticide may be selected, for example, from a group consisting of an insecticide, a pyrethroid, or a natural pyrethrum, although these are not intended as limitations.

In a particular embodiment, the pesticide may comprise *bacillus therengensus isralioans* (BTI). A further element of either of the systems 10,30, shown in FIG. 1, comprises a BTI culturing system 40, wherein BTI is substantially continuously cultured, or cultured as needed, and a continuous drip of BTI is provided via line 41 leading to drip hose 42 adjacent the inlet 23 of the periphyton bed 24.

As an additional or alternative embodiment, further systems and methods are envisioned for detoxifying one or more elements of the system 10,30. As an example (FIG. 1), the algal colony 24 may be harvested by means known in the art from its base 44, and a pesticide P may be added to the harvested algae to form a mixture 24'. This mixture 24' is exposed to sunlight or other means to provide detoxification and then ground to form a mulch 24". Such a mulch may then be used atop the base 44 to form a subsequent algal colony 24. The pesticide may be selected from a group consisting of natural pyrethrum, natural pepper, garlic, elder, and lemon sage, although these are not intended as limitations.

Further, the algal colony 24 may be harvested by means known in the art, and pesticide P may be added to the base 44 wherein water is not flowing, and allowed to detoxify the base 44. Following sufficient time for detoxification, an agonist may be added, such as an alkaline solution, to detoxify the pesticide prior to restarting water flow over the algal colony 24. In this case, the pesticide may comprise at least one of a synthetic pyrethroid or a natural pyrethrum.

It may be appreciated by one skilled in the art that additional embodiments may be contemplated, including alternate methods of introducing ozone and the use of alternate oxidizing agents to the treatment water.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

What is claimed is:

1. A method of treating water comprising the steps of:
   exposing water desired to be treated to ozone in sufficient quantity to reduce a concentration of undesired microorganisms therein;
   flowing the water over a colony of attached algae to remove undesired matter therefrom; and
   adding a pesticide to the algal colony for controlling insects, the pesticide selected from a group consisting of an insecticide, a pyrethroid, or a natural pyrethrum.

2. The method recited in claim 1, further comprising the step of adding a pesticide to the algal colony for controlling insects, the pesticide comprising *bacillus therengensus isralioans*.

3. The method recited in claim 2, further comprising the step of culturing *bacillus therengensus isralioans*, and wherein the pesticide-adding step comprises delivering a substantially continuous supply of *bacillus therengensus isralioans* to an inlet of the algal colony.

4. A method of treating water comprising the steps of:
   pumping water out of a body of water into a supply pipe;
   injecting ozone at a plurality of injection locations along the supply pipe, the ozone present insufficient quantity to reduce a concentration of undesired microorganisms therein;
   directing the water to an inlet end of a colony of attached algae; and
   flowing the water over the algal colony to remove undesired matter therefrom.

5. A method of treating water comprising the steps of:
   exposing water desired to be treated to ozone in sufficient quantity to reduce a concentration of undesired microorganisms therein;
   flowing the water over a colony of attached algae to remove undesired matter therefrom; and
   harvesting the algal colony, adding a pesticide to the harvested algae, exposing the mixed algae and pesticide to sunlight for achieving detoxification, and using the detoxified mixed algae and pesticide to form a base for another algal colony.

6. The method recited in claim 5, wherein the pesticide comprises one or more pesticides selected from a group consisting of natural pyrethrum, natural pepper, garlic, elder, and lemon sage.

7. A method of treating water comprising the steps of:
   exposing water desired to be treated to ozone in sufficient quantity to reduce a concentration of undesired microorganisms therein;
   flowing the water over a colony of algae attached to a base, to remove undesired matter therefrom; and
   harvesting the algal colony, adding a pesticide to the colony base, and detoxifying the base.

8. The method recited in claim 7, wherein the pesticide is selected from a group consisting of a synthetic pyrethroid and a natural pyrethrum.

9. A system for treating water comprising:
   means for exposing water desired to be treated to ozone in sufficient quantity to reduce a concentration of undesired microorganisms therein and to liberate available nutrients therefrom;
   a colony of attached algae for removing undesired matter from the ozone-exposed water; and
   means for directing the ozone-exposed water from the water-exposing means to the algal colony.

10. The system recited in claim 9, wherein the water-exposing means comprises a mixing chamber, means for injecting ozone into the mixing chamber, a pump for pumping the water to be treated into the mixing chamber, and a mixer for mixing the water to be treated with the injected ozone.

11. The system recited in claim 9, further comprising means for generating ozone comprising at least one of means for exposing air to ultraviolet radiation and means for creating a corona discharge.

12. The system recited in claim 9, further comprising means for exposing the water to be treated to at least one of ultraviolet radiation and acoustic energy.

13. The system recited in claim 9, further comprising:
   a tube having a bottom end and a top end;
   a pump for pumping the water into the tube bottom end and upward toward the top end;
   means for injecting ozone adjacent the tube bottom end of the tube, for permitting the water and the ozone to mix while being pumped toward a top end of the tube.

14. The system recited in claim 9, further comprising means for treating the water with ozone downstream of the algal colony.

15. The system recited in claim 9, further comprising the step of passing the water through an activated carbon filter following the water-flowing step.

16. The system recited in claim 9, further comprising:
   means for extracting the water to be treated from a body of water; and
   means for returning the treated water the to body of water downstream of the algal colony.

17. The system recited in claim 9, wherein the ozone-exposing means comprises a cover a body of water and means for injecting ozone into the body of water.

18. The system recited in claim 9, wherein the ozone-exposing means comprises:
   a supply pipe having an inlet end and an outlet end;
   a pump positioned to extract water out of a body of water into the supply pipe inlet end and to pump the extracted water to an inlet end of the algal colony; and
   means for injecting ozone into the supply pipe.

19. The system recited in claim 9, further comprising means for redirecting water from an outlet end of the algal colony to the ozone-exposing means for recirculating the water emerging from the algal colony.

20. A system for treating water comprising:
   means for exposing water desired to be treated to ozone in sufficient quantity to reduce a concentration of undesired microorganisms therein and to liberate available nutrients therefrom;
   a colony of attached algae for removing undesired matter from the ozone-exposed water;
   means for directing the ozone-exposed water from the water-exposing means to the algal colony; and
   means for adding a pesticide to the algal colony for controlling insects, the pesticide selected from a group consisting of an insecticide, a pyrethroid, a natural pyrethrum, and *bacillus therengensus isralioans*.

21. The system recited in claim 20, wherein the pesticide comprises *bacillus therengensus isralioans*, further comprising means of culturing the *bacillus therengensus isralioans*, and wherein the pesticide-adding means comprises means for delivering a substantially continuous supply of *bacillus therengensus isralioans* to an inlet of the algal colony.

22. A system for treating water comprising:

means for exposing water desired to be treated to ozone in sufficient quantity to reduce a concentration of undesired microorganisms therein and to liberate available nutrients therefrom;

a colony of attached algae for removing undesired matter from the ozone-exposed water;

means for directing the ozone-exposed water from the water-exposing means to the algal colony;

means for harvesting the algal colony following exposure to water to be treated; and means for adding a pesticide to the harvested algae.

23. The system recited in claim 22, wherein the pesticide comprises one or more pesticides selected from a group consisting of natural pyrethrum, natural pepper, garlic, elder, and lemon sage.

24. A system for treating water comprising:

means for exposing water desired to be treated to ozone in sufficient quantity to reduce a concentration of undesired microorganisms therein and to liberate available nutrients therefrom;

a colony of attached algae for removing undesired matter from the ozone-exposed water;

a base to which the algal colony is attached;

means for directing the ozone-exposed water from the water-exposing means to the algal colony;

means for harvesting the algal colony;

means for adding a pesticide to the colony base; and means for detoxifying the base.

25. The system recited in claim 24, wherein the pesticide is selected from a group consisting of a synthetic pyrethroid and a natural pyrethrum.

26. A method of treating water comprising the steps of:

exposing water desired to be treated to ozone in sufficient quantity to oxidize nutrients therein to a form amenable to bioassimilation by a colony of attached algae; and flowing the water over a floway comprising attached algae to remove the oxidized nutrients therefrom, the algae experiencing an enhanced photosynthetic activity upon bioassimilation of the oxidized nutrient.

27. The method recited in claim 26, wherein the nutrients comprise tannic and humic compounds.

28. A system for treating water comprising:

means for exposing water desired to be treated to ozone insufficient quantity to oxidize nutrients therein to a form amenable to bioassimilation by a colony of attached algae;

a floway comprising attached algae for removing the oxidized nutrients from the ozone-exposed water, the algae experiencing enhanced photosynthetic activity upon bioassimilation of the oxidized nutrients; and means for directing the ozone-exposed water from the water-exposing means to the floway.

29. The system recited in claim 28, wherein the nutrients comprise tannic and humic compounds.

* * * * *